(12) United States Patent
Takahashi

(10) Patent No.: US 12,405,062 B2
(45) Date of Patent: Sep. 2, 2025

(54) METAL MELT PUMP WITH HEAT INSULATING HOOD

(71) Applicant: ZMAG, LTD., Shiroi (JP)

(72) Inventor: Kenzo Takahashi, Shiroi (JP)

(73) Assignee: ZMAG, LTD., Shiroi (JP)

( * ) Notice: Subject to any disclaimer, the term of this patent is extended or adjusted under 35 U.S.C. 154(b) by 210 days.

(21) Appl. No.: 18/330,994

(22) Filed: Jun. 7, 2023

(65) Prior Publication Data

US 2023/0314079 A1 Oct. 5, 2023

Related U.S. Application Data

(63) Continuation of application No. PCT/JP2021/045304, filed on Dec. 9, 2021.

(30) Foreign Application Priority Data

Dec. 21, 2020 (JP) .................... 2020-211443

(51) Int. Cl.
*F27D 27/00* (2010.01)
*F04D 7/06* (2006.01)
*H02K 44/02* (2006.01)

(52) U.S. Cl.
CPC ........... *F27D 27/005* (2013.01); *H02K 44/02* (2013.01); *F04D 7/065* (2013.01)

(58) Field of Classification Search
CPC ............................... F27D 27/005; F04D 7/065
See application file for complete search history.

(56) References Cited

U.S. PATENT DOCUMENTS

| 5,947,705 A * | 9/1999 | Mordue .................. F04D 7/065 417/423.15 |
| 8,703,043 B2 * | 4/2014 | Takahashi .............. H02K 44/02 266/200 |
| 9,395,120 B2 * | 7/2016 | Rauch ....................... C21C 1/06 |

(Continued)

FOREIGN PATENT DOCUMENTS

| CN | 200963579 Y | * 10/2007 |
| CN | 101382153 A | * 3/2009 ........... F04D 13/027 |

(Continued)

OTHER PUBLICATIONS

Machine English Translation of CN-201335610-Y (Year: 2009).*

(Continued)

*Primary Examiner* — Nathan C Zollinger
(74) *Attorney, Agent, or Firm* — WTA IP Law P.C.

(57) ABSTRACT

A metal melt pump includes a bottomed cylinder body including a side wall, a melt flow passage body including a melt flow passage and being a body separate from the bottomed cylinder body, and a melt driving part including a magnetic field device and an electric motor and adapted to drive metal melt in the melt flow passage. The magnetic field device includes a plurality of permanent magnets arranged such that different magnetic poles are alternately arrayed along a circumference of a rotary shaft, and the melt flow passage body is removably provided on the bottomed cylinder body at a position around the side wall and where a magnetic force line from one of the permanent magnets penetrates through the side wall and an inner side flow passage wall of the melt flow passage body to reach the melt flow passage.

12 Claims, 6 Drawing Sheets

(56) References Cited

U.S. PATENT DOCUMENTS

2006/0133194 A1    6/2006  Takahashi
2011/0248432 A1   10/2011  Takahashi

FOREIGN PATENT DOCUMENTS

| CN | 201335610 Y | * | 10/2009 | |
|---|---|---|---|---|
| CN | 101382153 B | * | 6/2011 | ........... F04D 13/027 |
| CN | 112737275 A | * | 4/2021 | |
| EP | 2453564 A1 | * | 5/2012 | ............. H02K 44/06 |
| JP | 2004254437 A | * | 9/2004 | |
| JP | 2006-177612 A | | 7/2006 | |
| JP | 2011139611 A | * | 7/2011 | |
| JP | 2011-230187 A | | 11/2011 | |
| JP | 5546974 B | | 7/2014 | |

OTHER PUBLICATIONS

PCT International Search Report of PCT Application No. PCT/JP2021/045304 Mailed on Feb. 15, 2022.
PCT International Preliminary Report on Patentability of PCT Application No. PCT/JP2021/045304 Mailed on Jun. 29, 2023.
Extended European Search Report of Ep Application No. 21910347.0 mailed on Sep. 2, 2024.

* cited by examiner

METAL MELT PUMP WITH HEAT INSULATING HOOD

CROSS-REFERENCE TO RELATED APPLICATIONS

This is a bypass continuation application of International PCT Application No. PCT/JP2021/045304, filed on Dec. 9, 2021, which claims priority to Japanese Patent Application No. 2020-211443, filed on Dec. 21, 2020, which are incorporated by reference herein in their entirety.

TECHNICAL FIELD

The present invention relates to a metal melt pump, and more particularly to a metal melt pump that circulates or transfers metal melt inside a furnace.

BACKGROUND ART

Conventionally, there has been known a metal melt pump that drives non-ferrous metal melt (hereinafter simply referred to as "metal melt") using an electromagnetic force. For example, Patent Literature 1 describes a metal melt pump that drives metal melt using an electromagnetic force generated by a magnetic force line, which is output from a permanent magnet, moving while penetrating the metal melt. In this metal melt pump, the permanent magnet is rotatably disposed inside a cylindrical container and a spiral melt flow passage is provided inside a side wall of the cylindrical container.

SUMMARY

The metal melt pump of Japanese Patent No. 5546974 has been invented by the inventor of the present invention. Since then, the inventor has continued earnest efforts on research and development for realization of a more practical metal melt pump with a high performance. In such efforts, the following problems have uniquely been found.

When the use of the metal melt pump is halted, the metal melt gradually solidifies inside the flow passage so that the cross-sectional area of the flow passage of the melt flow passage is narrowed. As a result, the ejection amount (ejection pressure) of the metal melt pump decreases or in the worst case scenario, the metal melt pump becomes no longer usable. On the other hand, during the use of the metal melt pump, the melt flow passage is scraped off by the metal melt flowing through the melt flow passage in some cases. In any case, it is inevitable that the melt flow passage wears out as the metal melt pump is used.

In an attempt to renew the melt flow passage for the purpose of maintaining the performance of the metal melt pump, in the case of the aforementioned metal melt pump, since the melt flow passage is formed in the cylindrical container, the cylindrical container constituting the main body portion needs to be replaced with new one, which requires enormous cost (money and time).

Further, it is desirable to increase the ejection amount of the metal melt pump, but in an attempt to enlarge the cross-sectional area of the flow passage of the melt flow passage, in the case of the conventional metal melt pump, problems occur in handing in that the weight of the cylindrical container increases due to the side wall thickened, resulting in difficulty in performing installing work of the metal melt pump in a furnace, and the like.

The present invention has been made on the basis of the aforementioned recognition, and an object of the present invention is to provide a metal melt pump capable of renewing a melt flow passage easily and at low cost.

A metal melt pump according to the present invention is a metal melt pump that drives metal melt inside a furnace that includes a bottomed cylinder body including a side wall and a bottom wall, a melt flow passage body including a melt flow passage that connects a suction port and an ejection port, the melt flow passage body being a body separate from the bottomed cylinder body, and a melt driving part including a magnetic field device rotatably disposed around a vertically oriented rotary shaft inside the bottomed cylinder body and an electric motor that rotates the magnetic field device, the melt driving part adapted to drive metal melt in the melt flow passage, in which the magnetic field device includes a plurality of permanent magnets arranged such that different magnetic poles are alternately arrayed along a circumference of the rotary shaft, and the melt flow passage body is removably provided on the bottomed cylinder body at a position around the side wall of the bottomed cylinder body and where a magnetic force line from a first permanent magnet among the plurality of permanent magnets penetrates through the side wall of the bottomed cylinder body and an inner side flow passage wall of the melt flow passage body to reach the melt flow passage and penetrates from the melt flow passage through the inner side flow passage wall of the melt flow passage body and the side wall of the bottomed cylinder body to return to a second permanent magnet adjacent to the first permanent magnet.

Further, in the metal melt pump, the longitudinal cross-sectional shape of the melt flow passage may be a vertically-long and substantially rectangular shape.

Furthermore, in the metal melt pump, the plurality of permanent magnets of the magnetic field device may be greater in a longitudinal length than the melt flow passage, and may encompass the melt flow passage in a longitudinal direction in a side view.

Further, in the metal melt pump, the melt flow passage body may be provided so as to surround the side wall of the bottomed cylinder body.

Furthermore, in the metal melt pump, the melt flow passage body may have a planar shape in a substantially U-shape.

Moreover, the metal melt pump may further include a heat insulating hood configured to cover the magnetic field device and the electric motor of the melt driving part and to define a cooling air flow passage for cooling air to flow through the magnetic field device and the electric motor.

In addition, in the metal melt pump, the heat insulating hood may include a fixed hood fixed to a base plate that defines, together with the bottomed cylinder body, a space that houses the magnetic field device, the fixed hood covering the electric motor and provided with an air intake hole that takes in the cooling air, and a movable hood attached to the magnetic field device so as to define, together with the fixed hood, the cooling air flow passage and to cover an outer periphery surface of the magnetic field device, the movable hood adapted to rotate together with the magnetic field device.

Furthermore, in the metal melt pump, the fixed hood may include an upper side fixed hood with a lower end portion fixed to an upper face of the base plate, and a lower side fixed hood with an upper end portion fixed to a lower face of the base plate.

In addition, in the metal melt pump, a heat insulating material may be affixed to the fixed hood and the movable hood.

Further, in the metal melt pump, the fixed hood and the movable hood may be formed of metal material.

Further, in the metal melt pump, a lower end portion of the fixed hood may be loosely inserted into an upper end portion of the movable hood or the upper end portion of the movable hood may be loosely inserted into the lower end portion of the fixed hood.

Furthermore, in the metal melt pump, the base plate is provided with a first air hole positioned on an inner side of the fixed hood and a second air hole positioned on an outer side of the fixed hood, and cooling air taken in from the air intake hole of the fixed hood passes the first air hole to flow through the cooling air flow passage downward, passes the magnetic field device, and is released from a lower end portion of the movable hood, and subsequently, passes a space between the side wall of the bottomed cylinder body and the heat insulating hood and is discharged to the outside from the second air hole.

Further, in the metal melt pump, the bottomed cylinder body may include a support part projecting radially outward from the side wall, and the melt flow passage body may be removably supported on the bottomed cylinder body by means of the support part.

Furthermore, in the metal melt pump, the electric motor may be configured such that the number of rotation of the magnetic field device is variable in accordance with an ejection amount of the metal melt.

Moreover, the metal melt pump may further include a melt discharge pipe connected to the ejection port of the melt flow passage and adapted to pump the metal melt.

According to the present invention, a metal melt pump capable of renewing a melt flow passage easily and at low cost can be provided.

DETAILED DESCRIPTION OF EMBODIMENTS

Figure 1:
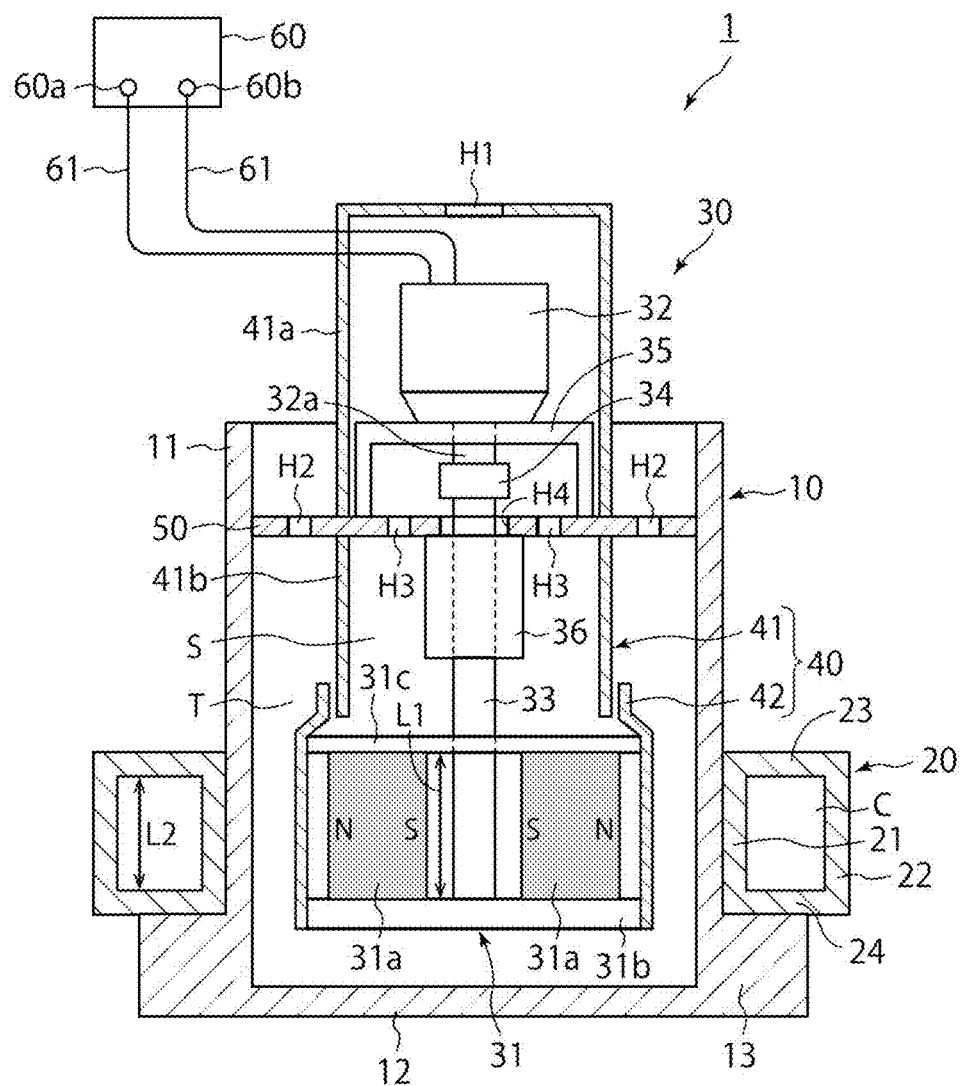
FIG. 1 is a cross-sectional view showing the schematic configuration of a metal melt pump according to an embodiment.

Hereinafter, an embodiment according to the present invention will be described with reference to the drawings. It should be noted that in the drawings, constituent elements having equivalent functions are assigned the same reference signs.

<Metal Melt Pump>

Figure 2:
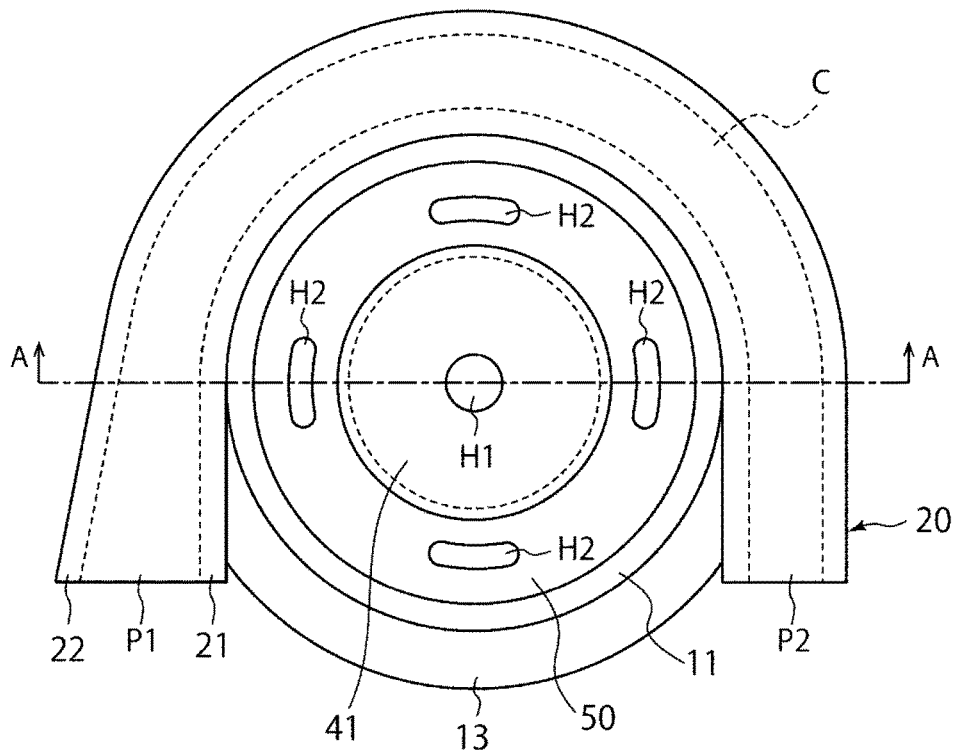
FIG. 2 is a plan view showing the schematic configuration of the metal melt pump according to the embodiment.

With reference to FIG. 1 to FIG. 5, the configuration of a metal melt pump 1 according to the embodiment will be described. FIG. 1 is a cross-sectional view taken along line A-A of FIG. 2, showing the schematic configuration of the metal melt pump 1.

The metal melt pump 1 according to the present embodiment is configured so as to be partially (at least a melt flow passage body 20) immersed in metal melt inside a furnace, such as a melting furnace and a holding furnace, to drive the metal melt using an electromagnetic force caused by eddy current as will be described later.

As illustrated in FIG. 1, the metal melt pump 1 includes a bottomed cylinder body (main body) 10, the melt flow passage body 20 provided with a melt flow passage C where metal melt flows, a melt driving part 30 that drives the metal melt in the melt flow passage C, a heat insulating hood 40 that thermally protects the melt driving part 30, and a base plate 50 that partitions an inner space of the bottomed cylinder body 10 and supports the melt driving part 30.

Hereinafter, the configuration of the metal melt pump 1 will be described in detail.

Figure 3:
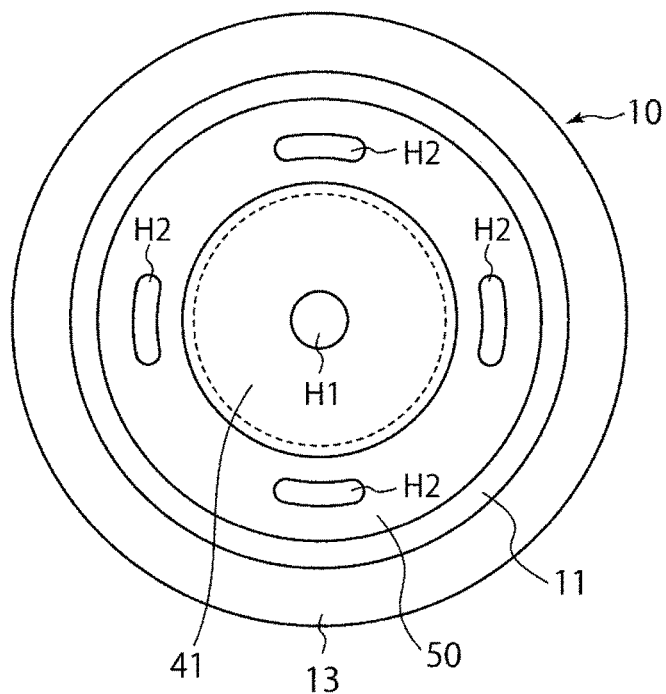
FIG. 3 is a plan view showing the metal melt pump with a melt flow passage body removed according to the embodiment.

The bottomed cylinder body 10 is a cylinder body with a bottom including a side wall 11 and a bottom wall 12. The side wall 11 is cylindrically formed. The bottom wall 12 closes a lower end portion of the side wall 11. In the present embodiment, as illustrated in FIG. 1 and FIG. 3, the bottomed cylinder body 10 includes a support part (flange portion) 13 projecting radially outward from the side wall 11. By means of the support part 13, the melt flow passage body 20 is removably supported on the bottomed cylinder body 10.

The bottomed cylinder body 10 is formed of a non-magnetic and fire-resistant material.

It should be noted that the bottomed cylinder body 10 is preferably formed by integrating the side wall 11 and the bottom wall 12. In this case, the integrally formed bottomed cylinder body 10 is produced by casting mortar or the like into a frame mold.

The melt flow passage body 20 is provided at a position around the side wall 11 of the bottomed cylinder body 10, as a body separate from the bottomed cylinder body 10. When the metal melt pump 1 is used, the melt flow passage body 20 is immersed in the metal melt inside the furnace and the melt flow passage C is filled with the metal melt (see FIG. 7). The melt flow passage body 20 is formed of a non-magnetic and fire-resistant material, for example, the same material as that of the bottomed cylinder body 10.

The inside of the melt flow passage body 20 is provided with the melt flow passage C that connects a suction port P1 and an ejection port P2. The melt flow passage C of the present embodiment is formed in a shape with the longitudinal cross-section closed. Specifically, as illustrated in FIG. 1, the melt flow passage body 20 includes an inner side flow passage wall 21, an outer side flow passage wall 22, an upper side flow passage wall 23, and a lower side flow passage wall 24, and the melt flow passage C with a substantially rectangular longitudinal cross-sectional shape is formed by these flow passage walls. Since an upper side of the melt flow passage C is not open in such a manner, the ejection pressure of the metal melt can be easily increased. The melt flow passage body 20 is preferably formed by integrating the inner side flow passage wall 21, the outer side flow passage wall 22, the upper side flow passage wall 23, and the lower side flow passage wall 24.

It should be noted that the longitudinal cross-sectional shape of the melt flow passage C is preferably a vertically-long and substantially rectangular shape. In this manner, since the radial length of the melt flow passage C becomes relatively shorter under conditions where the cross-sectional area of the flow passage is constant, a magnetic force line from a magnetic field device 31 easily penetrates the metal melt in the melt flow passage C, to thus be able to improve the force to drive the metal melt.

Further, as illustrated in FIG. 1, a longitudinal length (L1) of a plurality of permanent magnets 31a of the magnetic field device 31 may be greater than a longitudinal length (L2) of the melt flow passage C (i.e., L1>L2), and the melt flow passage C may be encompassed in a longitudinal direction in a side view. In this manner, the magnetic force lines from the magnetic field device 31 are substantially parallel to each other in the melt flow passage C. Consequently, the driving force of the metal melt pump is more easily controlled so that the ejection amount of the metal melt is more easily adjustable.

It should be noted that the longitudinal cross-sectional shape of the melt flow passage C is not limited to a rectangle, but may be a round, elliptic, or polygonal shape, or the like. Further, in a case where a high ejection pressure is not required, the upper side of the melt flow passage C may be opened by eliminating the upper side flow passage wall 23. In this case, a melt level of the metal melt inside the furnace needs to be lower than an upper end of the outer side flow passage wall 22.

Furthermore, as illustrated in FIG. 2, for easier sucking of the metal melt, the vicinity of an inlet of the melt flow passage C may be tapered so as to widen the suction port P1 as compared to the ejection port P2.

In addition, the width of the melt flow passage C may be greater than the thickness of the side wall 11 of the bottomed cylinder body 10. In this manner, as compared to the conventional case in which the side wall is provided with the flow passage, the cross-sectional area of the flow passage is enlarged to thus be able to increase the ejection amount.

In the present embodiment, as illustrated in FIG. 2, the melt flow passage body 20 has a planar shape in a substantially U-shape. The melt flow passage C is disposed so as to surround the side wall 11 in such a manner to thus be able to efficiently drive the metal melt in the melt flow passage C. However, the planar shape of the melt flow passage body 20 is not limited to a U-shape, but may be, for example, a substantially C-shape or L-shape. Further, the melt flow passage body 20 may include a spiral melt flow passage C.

Figure 4:
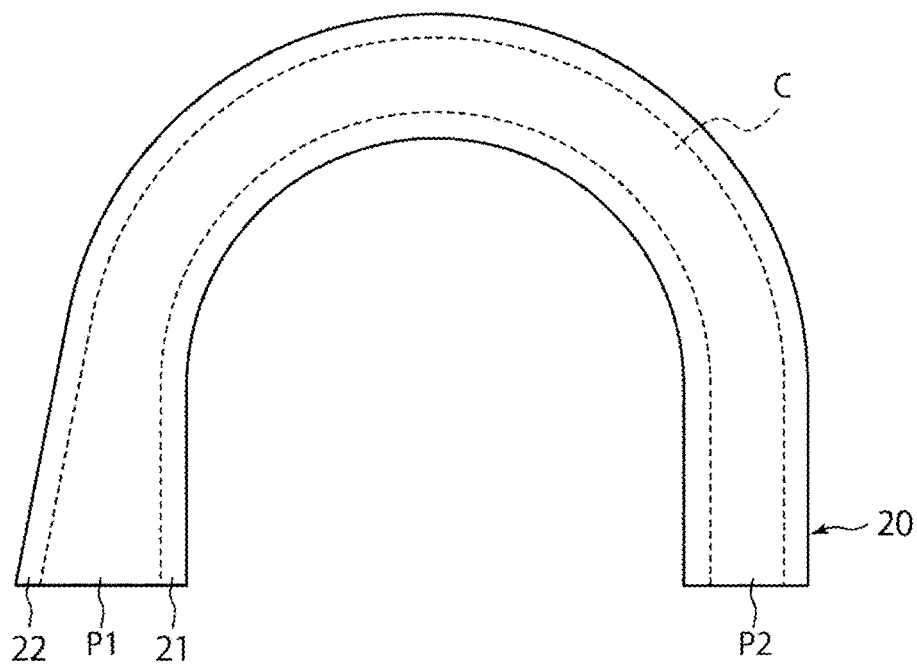
FIG. 4 is a plan view showing the melt flow passage body of the metal melt pump according to the embodiment.

As illustrated in FIG. 3 and FIG. 4, the melt flow passage body 20 is removably provided on the bottomed cylinder body 10. FIG. 3 shows a plan view of a main body portion of the metal melt pump 1 with the melt flow passage body 20 removed, and FIG. 4 shows a plan view of the melt flow passage body 20 that is removed from the metal melt pump 1.

The melt flow passage body 20 is removably provided on the bottomed cylinder body 10 at a position around the side wall 11 of the bottomed cylinder body 10 and where the magnetic force line from a first permanent magnet among the plurality of permanent magnets 31a of the magnetic field device 31 penetrates through the side wall 11 and the inner side flow passage wall 21 of the melt flow passage body 20 to reach the melt flow passage C and penetrates from the melt flow passage C through the inner side flow passage wall 21 and the side wall 11 to return to a second permanent magnet adjacent to the first permanent magnet.

It should be noted that the connecting arrangement between the bottomed cylinder body 10 and the melt flow passage body 20 is not limited to the arrangement using the support part 13 of the bottomed cylinder body 10. As another example, the melt flow passage body 20 may be removably connected to the bottomed cylinder body 10 such that the side wall 11 of the bottomed cylinder body 10 is provided with a projection (or a recess) and the inner side flow passage wall 21 of the melt flow passage body 20 is provided with a recess (or a projection), and the projection of the side wall 11 and the recess of the inner side flow passage wall 21 fit together. As further another example, the melt flow passage body 20 may be removably connected to the bottomed cylinder body 10 such that a fixation hole (not shown) is formed in each of the side wall 11 and the outer side flow passage wall 22 and an end of a coupling member (e.g., a connecting member in a U-shape facing sideways) is inserted into each hole.

Further, a plurality of melt flow passage bodies 20 with different cross-sectional areas (e.g., height) of the flow passage of the melt flow passage C may be prepared and selectively used in accordance with a desired ejection amount or the like.

It should be noted that in FIG. 1, the inner side flow passage wall 21 of the melt flow passage body 20 contacts, without a gap, the side wall 11 of the bottomed cylinder body 10. In this manner, the distance between the melt flow passage C and the magnetic field device 31 is reduced to thus intensify the magnetic field penetrating the metal melt in the melt flow passage C, thereby enabling the force to drive the metal melt to be enhanced. However, the present invention is not limited thereto, but a gap may be provided between the side wall 11 and the inner side flow passage wall 21.

Next, the melt driving part 30 will be described.

The melt driving part 30 is configured so as to drive the metal melt in the melt flow passage C formed in the melt flow passage body 20, using an electromagnetic force. The melt driving part 30 drives the metal melt in the melt flow passage C from the suction port P1 toward the ejection port P2, thereby ejecting the metal melt from the ejection port P2 and causing the metal melt inside the furnace to be sucked into the melt flow passage C from the suction port P1.

The melt driving part 30 includes the magnetic field device (rotary magnet body) 31, an electric motor 32 for rotating the magnetic field device 31, a rotary shaft (rotary shaft) 33 connected to the magnetic field device 31, a coupling (shaft coupling) 34, a mount 35, and a bearing housing 36.

Figure 5:
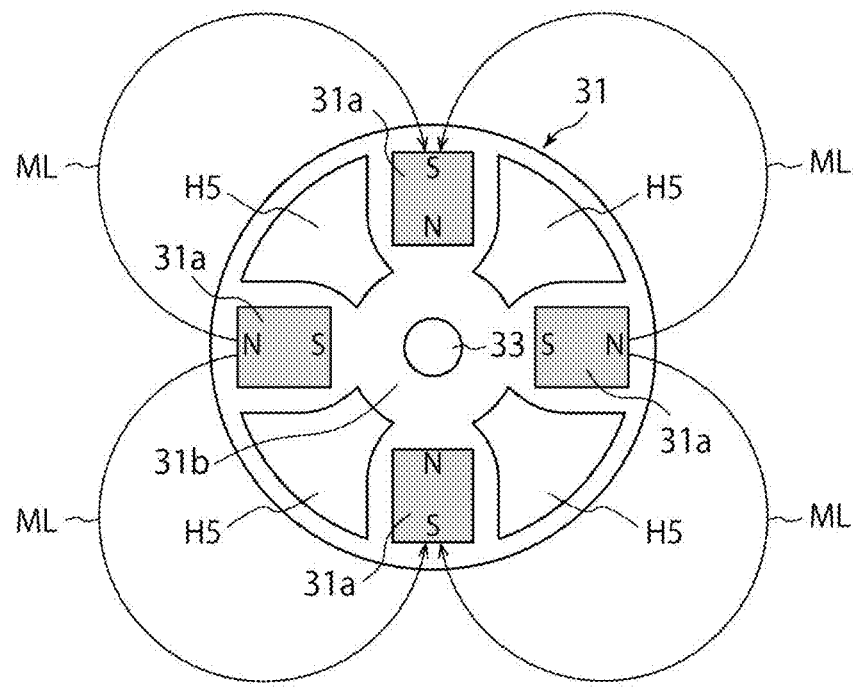
FIG. 5 is a plan view showing a magnetic field device according to the embodiment.

As illustrated in FIG. 1, the magnetic field device 31 is rotatably disposed around the rotary shaft 33 vertically oriented inside the bottomed cylinder body 10. As illustrated in FIG. 1 and FIG. 5, the magnetic field device 31 includes the plurality of permanent magnets (magnet pieces) 31a and support plates 31b and 31c that support the plurality of permanent magnets 31a. It should be noted that in FIG. 5, the support plate 31c is not shown (the same in FIG. 6). In the present embodiment, four permanent magnets 31a are fixed on the support plate 31b. The support plate 31b and the support plate 31c fix the plurality of permanent magnets 31a so as to sandwich the permanent magnets 31a from above and below.

Each permanent magnet 31a has an outer face magnetic pole and an inner face magnetic pole that are magnetized such that an outer periphery portion and an inner periphery portion become magnetic poles, and the magnetic field device 31 is disposed inside the bottomed cylinder body 10 such that the outer face magnetic poles face the side wall 11 of the bottomed cylinder body 10.

As illustrated in FIG. 5, the plurality of permanent magnets 31a is arranged on the circumference of the rotary shaft 33. More specifically, the plurality of permanent magnets 31a is arranged such that different outer face magnetic poles are alternately arrayed along the circumference of the rotary shaft 33. In this manner, the magnetic force line ML output from the N-pole of a certain permanent magnet 31a (first permanent magnet) enters the S-pole of another permanent magnet 31a (second permanent magnet) adjacent to the certain permanent magnet 31a. It should be noted that for forming such magnetic force lines ML for all the permanent magnets 31a, the number of the permanent magnets 31a is preferably an even number.

As illustrated in FIG. 5, the support plate 31b is provided with an air hole H5 to allow cooling air introduced into the heat insulating hood 40 to flow around the plurality of permanent magnets 31a. The shape of the support plate 31b is not limited to that shown in FIG. 5, but may be, for example, a substantially cross shape. The support plate 31c in the same shape as that of the support plate 31b may be used.

It should be noted that in the magnetic field device 31, either the support plate 31b or the support plate 31c may be omitted. In the case where the support plate 31b is omitted, the plurality of permanent magnets 31a is supported (suspended) by the support plate 31c.

Figure 6:
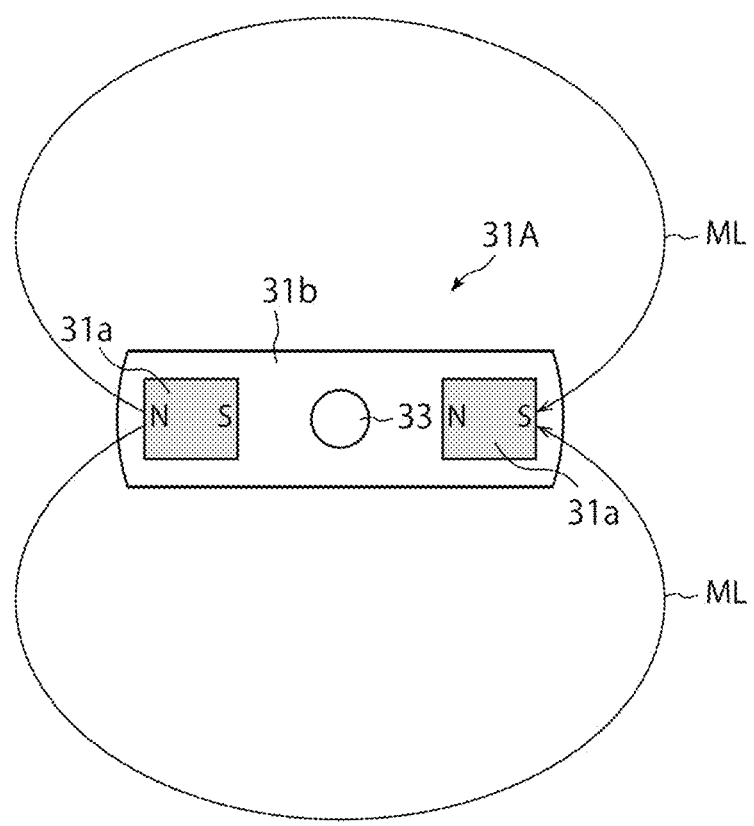
FIG. 6 is a plan view showing a magnetic field device according to a modification of the embodiment.

FIG. 6 is a plan view of a magnetic field device 31A according to a modification. In the magnetic field device 31A, the support plate 31b is in a plate rod shape, and the permanent magnet 31a is fixed to each of the opposite ends of the support plate 31b. In the present modification also, two permanent magnets 31a are arranged such that different magnetic poles are alternately arrayed along the circumference of the rotary shaft 33.

Other than the above, the magnetic field device having six permanent magnets 31a, eight permanent magnets 31a, and so forth is conceivable. In general, the magnetic field device with a fewer number of permanent magnets has an advantage in that the magnetic force line ML reaches farther. Meanwhile, when the rotation speed of the magnetic field device 31 is the same, the magnetic field device with a greater number of permanent magnets 31a has a greater temporal change in the magnetic force line in the metal melt, so that the melt driving force can be increased.

As illustrated in FIG. 1, the electric motor 32 includes a rotary shaft 32a and is installed on the mount 35 such that the rotary shaft 32a is vertically oriented. The rotary shaft 32a is connected to the rotary shaft 33 via the coupling 34. The magnetic field device 31 rotates about the rotary shaft 33 by the rotation of the rotary shaft 32a.

As illustrated in FIG. 1, the electric motor 32 is electrically connected to a power control panel 60 via a connecting conductor 61. For example, the electric motor 32 is a DC motor and is connected to a positive electrode terminal 60a and a negative electrode terminal 60b of the power control panel 60. The rotation speed (namely, the rotation speed of the magnetic field device 31) of the electric motor 32 can be controlled by adjusting the output (voltage, current, and the like) of the power control panel 60. The ejection amount of the metal melt from the ejection port P2 of the melt flow passage body 20 can be increased by increasing the rotation speed of the electric motor 32. In this manner, the electric motor 32 is configured such that the number of rotation of the magnetic field device 31 is variable in accordance with the ejection amount of the metal melt.

It should be noted that the type of the electric motor 32 is not particularly limited, and may be an AC motor or the like. Further, in the case of the AC motor, the rotation speed of the electric motor 32 may be controlled by an inverter (not shown) of the power control panel 60.

As illustrated in FIG. 1, the rotary shaft 33 is inserted through the bearing housing 36 and the base plate 50 (shaft insertion hole H4) and connects the magnetic field device 31 and the electric motor 32. A lower end of the rotary shaft 33 is fixed to the magnetic field device 31 (support plate 31b) and an upper end of the rotary shaft 33 is connected to the rotary shaft 32a of the electric motor 32 via the coupling 34.

The base plate 50 is a plate-like member provided so as to partition the inner space of the bottomed cylinder body 10. A space that houses the magnetic field device 31 is defined by the base plate 50 and the bottomed cylinder body 10. The base plate 50 is provided with air holes H2 and H3 and the shaft insertion hole H4. Specifically, as illustrated in FIG. 1, the base plate 50 is provided with the air hole H2 positioned on an outer side of a fixed hood 41, and the air hole H3 and the shaft insertion hole H4 that are positioned on an inner side of the fixed hood 41. It should be noted that the base plate 50 may be a cover plate that closes an upper end portion of the bottomed cylinder body 10.

The coupling 34 is a shaft coupling member that couples the rotary shaft 32a of the electric motor 32 and the rotary shaft 33 fixed to the magnetic field device 31.

The mount 35 is fixed on the base plate 50. The electric motor 32 is installed on the mount 35. An upper face of the mount 35 is configured so as to allow cooling air to pass through. For example, the upper face of the mount 35 is formed in a mesh or a grid shape. It should be noted that in a case where the rotary shaft 32a and the rotary shaft 33 are integrally formed or the like, the electric motor 32 may be directly installed on the base plate 50 by omitting the mount 35.

The bearing housing 36 houses a bearing (not shown) and is fixed to a lower face of the base plate 50 as illustrated in FIG. 1.

Next, the heat insulating hood 40 will be described.

The heat insulating hood 40 is provided for protecting the melt driving part 30 (in particular, the magnetic field device 31) from the heat of the metal melt inside the furnace. As illustrated in FIG. 1, the heat insulating hood 40 is configured to cover the magnetic field device 31 and the electric motor 32 of the melt driving part 30 and to define a cooling air flow passage S for allowing the cooling air introduced from the outside to flow through the magnetic field device 31 and the electric motor 32.

In the present embodiment, the heat insulating hood 40 includes the fixed hood 41 fixed to the base plate 50 and a movable hood 42 that rotates together with the magnetic field device 31.

The fixed hood 41 covers the electric motor 32 and is provided with an air intake hole H1 for taking in the cooling air from the outside. In the present embodiment, the air intake hole H1 is provided on an upper face of an upper side fixed hood 41a. A blower (not shown) may be connected to the air intake hole H1.

The movable hood 42 is attached to the magnetic field device 31 so as to define, together with the fixed hood 41, the cooling air flow passage S and to cover an outer periphery surface of the magnetic field device 31. As illustrated in FIG. 1, in the present embodiment, the inner diameter of an upper end portion of the movable hood 42 is adjusted to be slightly greater than the outer diameter of the fixed hood 41 (lower side fixed hood 41*b*) and a lower end portion of the fixed hood 41 (lower side fixed hood 41*b*) is loosely inserted into the upper end portion of the movable hood 42. With a small gap provided between the fixed hood 41 and the movable hood 42, the movable hood 42 is rotatable while the cooling air is prevented from leaking. It should be noted that the upper end portion of the movable hood 42 may be loosely inserted into the lower end portion of the fixed hood 41 (lower side fixed hood 41*b*).

The heat insulating hood 40 (fixed hood 41 and movable hood 42) is preferably formed of material that is relatively thin, but still satisfies required mechanical strength and heat resistance, for example, metal material, such as stainless steel. Even in the case where the movable hood 42 is formed of metal material, since the movable hood 42 rotates together with the magnetic field device 31, no eddy current occurs in the movable hood 42. Thus, by adopting the configuration of the movable hood 42, the rotation speed of the electric motor 32 can be significantly increased (e.g., 500 to 750 r/min at the maximum), as compared to the case in which the fixed hood 41 covers the magnetic field device 31. As a result, the force to drive the metal melt can be significantly improved.

It should be noted that in order to improve the heat insulating effect, a heat insulating material is preferably affixed to the fixed hood 41 and the movable hood 42.

The fixed hood 41 of the present embodiment incudes the upper side fixed hood 41*a* and the lower side fixed hood 41*b*.

The upper side fixed hood 41*a* is a cylinder body with a lower end portion fixed to an upper face of the base plate 50. As illustrated in FIG. 1, in the upper side fixed hood 41*a* of the present embodiment, an upper end portion is closed and the upper face is provided with the air intake hole H1. It should be noted that the air intake hole H1 may be provided on a side face of the upper side fixed hood 41*a*. Further, the upper side fixed hood 41*a* may be a cylinder body with the upper end portion opened. The shape of the upper side fixed hood 41*a* is not limited to a cylinder shape, but may be a dome shape or the like.

The lower side fixed hood 41*b* is a cylinder body with an upper end portion fixed to the lower face of the base plate 50. In the present embodiment, in the lower side fixed hood 41*b*, the upper end portion and the lower end portion are opened and the upper end portion is fixed to the lower face of the base plate 50.

It should be noted that the fixed hood 41 may be integrally formed instead of being formed with separate bodies, such as the upper side fixed hood 41*a* and the lower side fixed hood 41*b*. In this case, for example, the fixed hood 41 is fixed to the base plate 50 in a state of penetrating the base plate 50.

<Operation of Metal Melt Pump 1>

Next, the operation of the above-described metal melt pump 1 according to the embodiment will be described.

Figure 7:
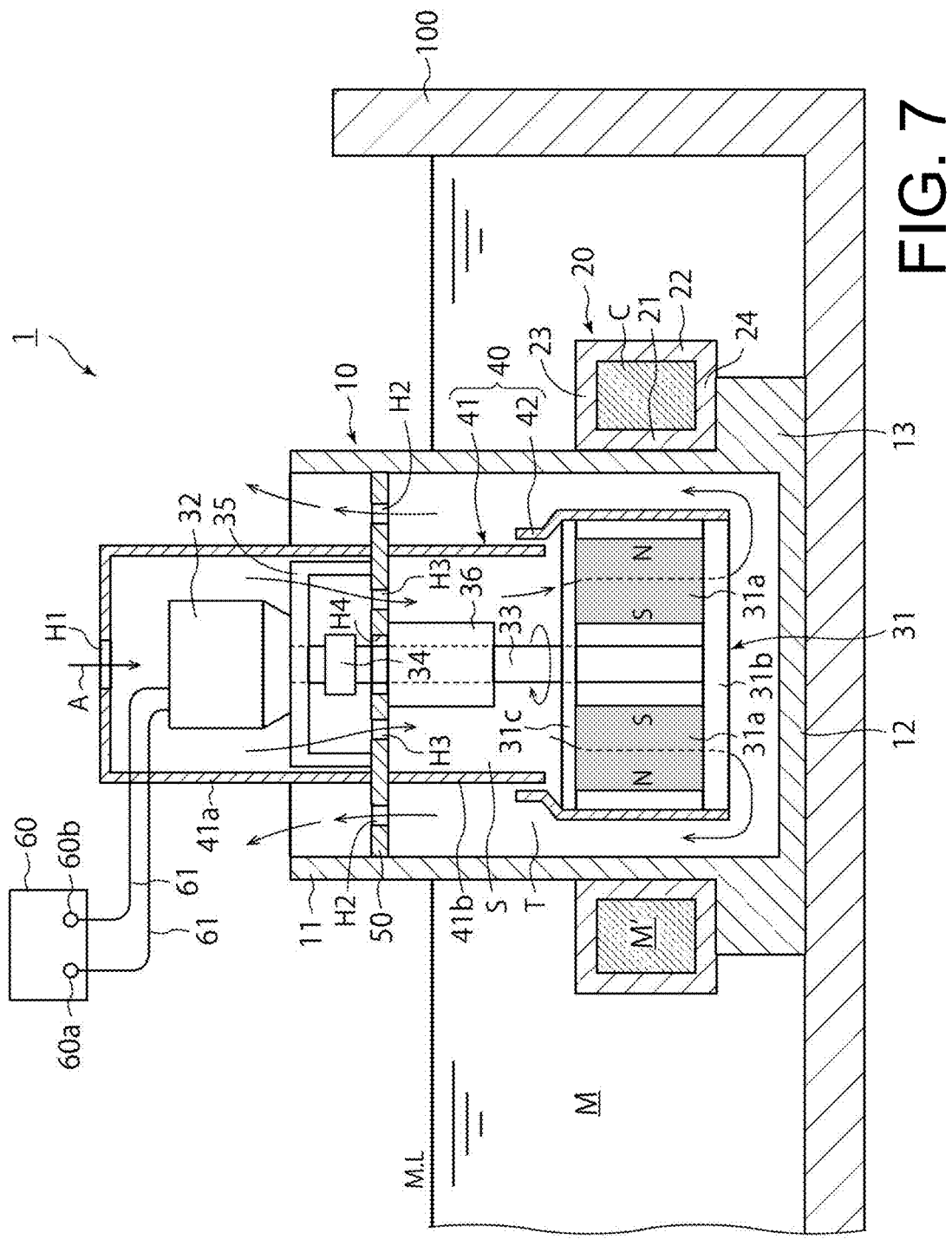
FIG. 7 is a cross-sectional view of the metal melt pump in a state of being immersed in metal melt inside a furnace according to the embodiment.

As illustrated in FIG. 7, the metal melt pump 1 is sunk in metal melt M inside a furnace 100. The furnace 100 is, for example, a melting furnace for melting non-ferrous metal, such as aluminum, or a holding furnace for holding metal melt. It should be noted that the non-ferrous metal may be, for example, Al, Cu, and Zn or at least two alloys of these, or an Mg alloy.

It should be noted that it is preferable that before installing the metal melt pump 1 inside the furnace 100, the bottomed cylinder body 10 and the melt flow passage body 20 be pre-heated for reducing the thermal impact. The pre-heating processing is performed by, for example, blowing hot air from the air intake hole H1.

Figure 8:
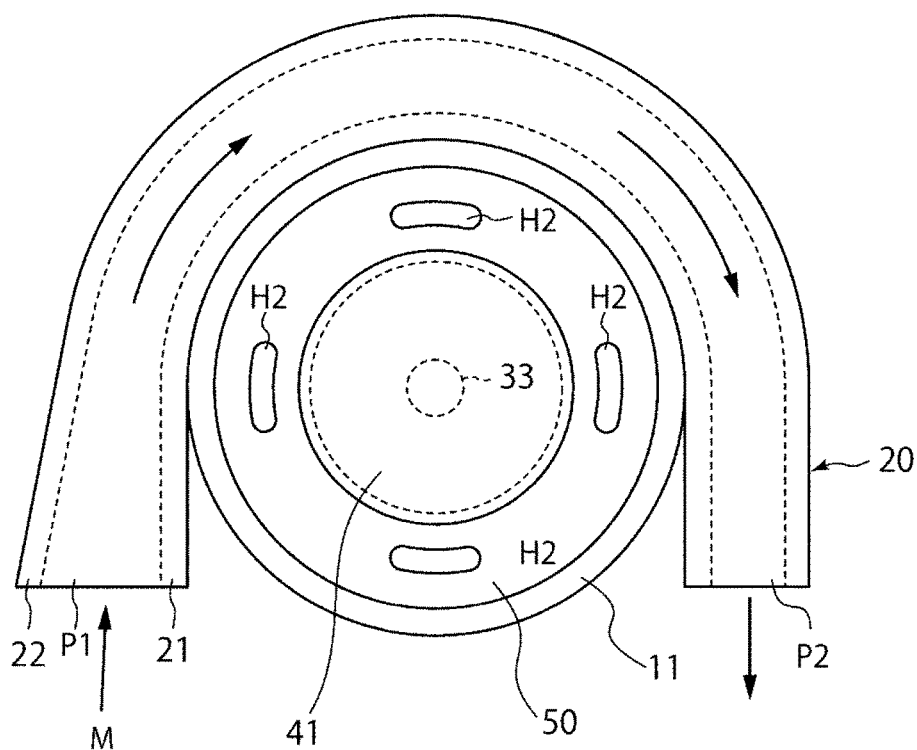
FIG. 8 is a plan view of the metal melt pump in the state of being immersed in the metal melt inside the furnace according to the embodiment.

Subsequently, the power control panel 60 is operated to drive the electric motor 32 at a rotation speed in accordance with a desired ejection amount. With the rotation of the magnetic field device 31, the magnetic force line ML that is output from a certain permanent magnet 31*a* to enter the adjacent permanent magnet 31*a* moves while penetrating metal melt M' in the melt flow passage C. The movement of the magnetic force line ML generates eddy current in the metal melt M'. By the electromagnetic force acting on the metal melt M' due to the eddy current, the metal melt M' in the melt flow passage C is driven in the circumferential direction of the rotary shaft 33 as illustrated in FIG. 8. In this manner, the metal melt M' in the melt flow passage C is ejected from the ejection port P2 and the external metal melt M in the furnace 100 is sucked from the suction port P1 into the melt flow passage C. As a result, the metal melt inside the furnace 100 circulates.

It should be noted that during the operation of the metal melt pump 1, cooling air A is blown into the heat insulating hood 40 via the air intake hole H1 to cool the magnetic field device 31 and the electric motor 32. As illustrated in FIG. 7, the cooling air taken in from the air intake hole H1 of the fixed hood 41 cools the electric motor 32, and then passes the air hole H3 to flow through the cooling air flow passage S downward, passes the magnetic field device 31, and is released from the lower end portion of the movable hood 42, and subsequently, passes a space (cooling air flow passage T) between the side wall 11 of the bottomed cylinder body 10 and the heat insulating hood 40 and is discharged to the outside from the air hole H2 of the base plate 50. In this manner, the cooling air is prevented from stagnating on a bottom portion of the bottomed cylinder body 10 so that the magnetic field device 31 and the electric motor 32 can be effectively cooled.

Figure 9:
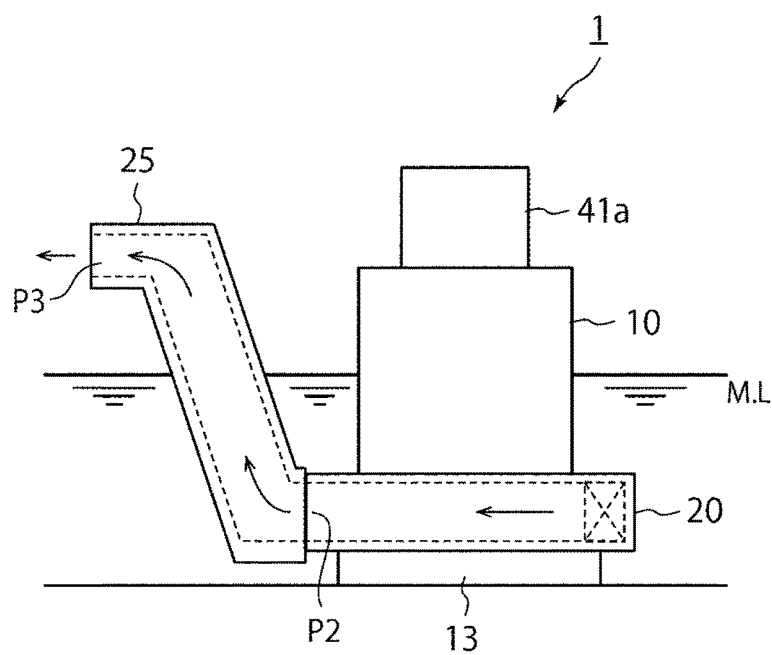
FIG. 9 is a side view showing the metal melt pump with a melt discharge pipe mounted in an ejection port of the melt flow passage body according to the embodiment.

Further, the metal melt pump 1 is usable not only for circulating the metal melt inside the furnace, but also for pumping the metal melt. In this case, as illustrated in FIG. 9, a melt discharge pipe 25 is connected to the ejection port P2 of the melt flow passage C. The melt discharge pipe 25 is connected at one end to the ejection port P2 of the melt flow passage body 20 and the other end (discharge port P3) is opened. The discharge port P3 is positioned above a melt level M.L in the state in which the metal melt pump 1 is installed inside the furnace. In this manner, the metal melt in the melt flow passage C is driven to be ejected from the ejection port P2, and then passes through the melt discharge pipe 25 to be pumped up into an external tub (not shown) or the like.

As described above, in the metal melt pump 1 according to the present embodiment, the melt flow passage body 20 is removably provided on the bottomed cylinder body 10 as a body separate from the bottomed cylinder body 10. More specifically, the melt flow passage body 20 is removably provided on the bottomed cylinder body 10 at a position around the side wall 11 of the bottomed cylinder body 10 and where the magnetic force line from the first permanent magnet among the plurality of permanent magnets 31*a* penetrates through the side wall 11 and the inner side flow passage wall 21 to reach the melt flow passage C and penetrates from the melt flow passage C through the inner side flow passage wall 21 and the side wall 11 to return to the second permanent magnet adjacent to the first permanent magnet. In this manner, according to the present embodiment, the melt flow passage C can be renewed easily and at low cost. Consequently, the metal melt in the melt flow passage C can be efficiently driven in use, and in a case where the ejection amount decreases, the performance of the metal melt pump can be recovered quickly and at low cost by replacing the melt flow passage body 20.

Further, according to the present embodiment, since the melt flow passage body 20 that is a body separate from the bottomed cylinder body 10 is provided with the melt flow passage C, the cross-sectional area of the flow passage can be easily enlarged as compared to the case in which the melt flow passage is provided inside the side wall as in the conventional metal melt pump. In this manner, the ejection amount of the metal melt can be significantly increased. Even when the cross-sectional area of the flow passage of the melt flow passage C is enlarged, the weight of the bottomed cylinder body 10 is unchanged, thereby being able to suppress the increase in the weight of the metal melt pump 1. Therefore, operability of the metal melt pump 1 is prevented from degrading, thereby allowing the installation work or the like in the furnace to be relatively easily performed.

Furthermore, according to the present embodiment, the heat insulating hood 40 thermally protects the melt driving part 30 and defines the cooling air flow passages S and T. In this manner, stagnation of the cooling air on the bottom portion of the bottomed cylinder body 10 as in the conventional metal melt pump is suppressed so that the cooling efficiency can be improved.

In addition, according to the present embodiment, even in the case where the movable hood 42 is formed of metal material, since the movable hood 42 of the heat insulating hood 40 is configured so as to rotate together with the magnetic field device 31, eddy current can be prevented from occurring in the movable hood 42 during the rotation of the magnetic field device 31. In this manner, the rotation speed of the magnetic field device 31 can be set high to thus be able to significantly increase the ejection amount of the metal melt while saving the power consumption. As a result, the metal melt inside the furnace can be sufficiently circulated using the metal melt pump 1.

It should be noted that the heat insulating hood may be applied to a metal melt pump in which the melt flow passage is formed in the side wall of the bottomed cylinder body, without limiting to the configuration of the aforementioned embodiment. Thus, for example, the cooling efficiency of the permanent magnets or the like of the metal melt pump of Japanese Patent No. 5546974 can be improved.

A person skilled in the art may be able to conceive of additional effects or various modifications of the present invention on the basis of the above description, but the aspect of the present invention is not limited to the aforementioned embodiment. Various additions, modifications, and partial deletion are available without departing the conceptual idea and the gist of the present invention derived from the content defined in the claims and the equivalents thereof.

REFERENCE NUMERAL LIST

1 metal melt pump
10 bottomed cylinder body
11 side wall
12 bottom wall
13 support part
20 melt flow passage body
21 inner side flow passage wall
22 outer side flow passage wall
23 upper side flow passage wall
24 lower side flow passage wall
25 melt discharge pipe
30 melt driving part
31, 31A magnetic field device
31*a* permanent magnet
31*b*, 31*c* support plate
32 electric motor
32*a* rotary shaft
33 rotary shaft
34 coupling
35 mount
36 bearing housing
40 heat insulating hood
41 fixed hood
41*a* upper side fixed hood
41*b* lower side fixed hood
42 movable hood
50 base plate
60 power control panel
60*a*, 60*b* terminal
61 connecting conductor
100 furnace
A cooling air
C melt flow passage
H1 air intake hole
H2, H3 air hole
H4 shaft insertion hole
H5, H6 air hole
M, M' metal melt
ML magnetic force line
P1 suction port
P2 ejection port
P3 discharge port
S, T cooling air flow passage

What is claimed is:

1. A metal melt pump that drives metal melt inside a furnace, the metal melt pump comprising:
   a bottomed cylinder body including a side wall and a bottom wall;
   a melt flow passage body including a melt flow passage that connects a suction port and an ejection port, the melt flow passage body being a body separate from the bottomed cylinder body; and
   a melt driving part including a magnetic field device rotatably disposed around a vertically oriented rotary shaft inside the bottomed cylinder body and an electric motor that rotates the magnetic field device, the melt driving part adapted to drive metal melt in the melt flow passage,
   wherein
   the magnetic field device includes a plurality of permanent magnets arranged such that different magnetic poles are alternately arrayed along a circumference of the rotary shaft, and
   the melt flow passage body is removably provided on the bottomed cylinder body at a position around the side wall of the bottomed cylinder body and where a magnetic force line from a first permanent magnet among the plurality of permanent magnets penetrates through the side wall of the bottomed cylinder body and an inner side flow passage wall of the melt flow passage body to reach the melt flow passage and penetrates from the melt flow passage through the inner side flow passage wall of the melt flow passage body and the side wall of the bottomed cylinder body to return to a second permanent magnet adjacent to the first permanent magnet, the metal melt pump further comprising:

a heat insulating hood configured to cover the magnetic field device and the electric motor of the melt driving part and to define a cooling air flow passage for cooling air to flow through the magnetic field device and the electric motor, wherein the heat insulating hood comprises:

a fixed hood fixed to a base plate that defines, together with the bottomed cylinder body, a space that houses the magnetic field device, the fixed hood covering the electric motor and provided with an air intake hole that takes in the cooling air; and a movable hood attached to the magnetic field device so as to define, together with the fixed hood, the cooling air flow passage and to cover an outer periphery surface of the magnetic field device, the movable hood adapted to rotate together with the magnetic field device, wherein a lower end portion of the fixed hood is loosely inserted into an upper end portion of the movable hood or the upper end portion of the movable hood is loosely inserted into the lower end portion of the fixed hood.

2. The metal melt pump according to claim 1, wherein a longitudinal cross-sectional shape of the melt flow passage is a vertically-long and substantially rectangular shape.

3. The metal melt pump according to claim 1, wherein the plurality of permanent magnets of the magnetic field device is greater in a longitudinal length than the melt flow passage, and encompasses the melt flow passage in a longitudinal direction in a side view.

4. The metal melt pump according to claim 1, wherein the melt flow passage body is provided so as to surround the side wall of the bottomed cylinder body.

5. The metal melt pump according to claim 4, wherein the melt flow passage body has a planar shape in a substantially U-shape.

6. The metal melt pump according to claim 1, wherein the fixed hood comprises:

an upper side fixed hood with a lower end portion fixed to an upper face of the base plate; and a lower side fixed hood with an upper end portion fixed to a lower face of the base plate.

7. The metal melt pump according to claim 1, wherein a heat insulating material is affixed to the fixed hood and the movable hood.

8. The metal melt pump according to claim 1, wherein the fixed hood and the movable hood are formed of metal material.

9. The metal melt pump according to claim 1, wherein the base plate is provided with a first air hole positioned on an inner side of the fixed hood and a second air hole positioned on an outer side of the fixed hood, and the cooling air taken in from the air intake hole of the fixed hood passes the first air hole to flow through the cooling air flow passage downward, passes the magnetic field device, and is released from a lower end portion of the movable hood, and subsequently, passes a space between the side wall of the bottomed cylinder body and the heat insulating hood and is discharged to an outside from the second air hole.

10. The metal melt pump according to claim 1, wherein the bottomed cylinder body comprises a support part projecting radially outward from the side wall, and the melt flow passage body is removably supported on the bottomed cylinder body by means of the support part.

11. The metal melt pump according to claim 1, wherein the electric motor is configured to change a rotation speed of the magnetic field device in accordance with an ejection amount of the metal melt.

12. The metal melt pump according to claim 1, further comprising a melt discharge pipe connected to the ejection port of the melt flow passage and adapted to pump the metal melt.

* * * * *